United States Patent [19]

Gerhart et al.

[11] Patent Number: 4,719,160
[45] Date of Patent: Jan. 12, 1988

[54] METHOD AND APPARATUS FOR MAKING WHITE LIGHT HOLOGRAMS

[76] Inventors: Grant R. Gerhart, 916 Candlestick Ct., Bloomfield Hills, Mich. 48013; Gregory Arutunian, 17190 Fenelon, Detroit, Mich. 48212

[21] Appl. No.: 874,199
[22] Filed: Jun. 11, 1986
[51] Int. Cl.⁴ .............................................. G03H 1/06
[52] U.S. Cl. ......................................... 430/2; 350/3.68; 350/3.75; 350/3.77; 350/3.81; 350/3.83; 430/1
[58] Field of Search .......................... 430/1, 2; 350/3.67, 350/3.68, 3.6, 3.75, 3.81, 3.83, 3.84, 3.77

[56] References Cited

U.S. PATENT DOCUMENTS

| | | | |
|---|---|---|---|
| 3,514,177 | 5/1970 | Lohmann | 350/3.68 |
| 3,558,207 | 1/1971 | Worthington | 350/3.6 |
| 3,567,305 | 3/1971 | Collier et al. | 350/3.6 |
| 3,815,969 | 6/1974 | Fletcher et al. | 350/3. |
| 3,970,358 | 7/1976 | Kozma | 350/3.7 |
| 4,244,633 | 1/1981 | Kellie | 350/3.7 |
| 4,598,973 | 7/1986 | Greenleaf | 350/3. |

Primary Examiner—John E. Kittle
Assistant Examiner—Jos/ G. Dees
Attorney, Agent, or Firm—Peter A. Taucher; Gail S. Soderling

[57] ABSTRACT

A method of making a white light hologram is disclosed. A diffraction grating is placed in contact with a film emulsion to provide a reference and object beam from the same light source.

9 Claims, 4 Drawing Figures

METHOD AND APPARATUS FOR MAKING WHITE LIGHT HOLOGRAMS

GOVERNMENT INTEREST

The invention describe herein may be manufactured, used, and licensed by or for the Government for governmental purposes without payment to us of any royalty thereon.

Holography was invented by Gabor in 1948, however very few applications were developed until the invention of the laser in the early 1960's. The utilization of the laser along with the invention of off-axis holography by Leith and Upatnieks made holography practical for the first time. A number of very important applications currently exist for optical holography including inteferometry, optical signal processing, 3-D image displays and digital computer memory.

An obvious application of holography is the display of 3-D imagery for commercial and entertainment purposes. The recent hologram on the cover of *National Geographic* is a good example, although several technological problems have limited the utilization of holography for more wide spread applications.

A major limitation to the increased application of holography has been the requirement of laser light illumination during the hologram construction phase. Since a high degree of temporal coherence or equivalently monochromaticity of the illuminating light source is required, only lasers can be used and then only with relatively small objects. The amount of temporal coherence determines the path length difference between the object and reference beams which must ultimately be split and recombined to form the microscopic holographic interference fringes. Generally lasers have a temporal coherence length of only a few centimeters. Since off-axis holography requires a temporal coherence length which is twice the depth of the object, holograms can only be made of relatively small objects. Lasers with temporal coherence lengths of 1–10 meters can be utilized for certain specialized applications, however their cost is prohibitive for general use and their technical complexity is beyond the scope of most holographers.

In addition the holographic optical instrumentation along with the object, laser, and photographic emulsion must be placed on an isolation table to stabilize the hologram during exposure from environmental vibration phenomena and maintain a fixed position relationship between these components during the exposure time interval; consequently the object dimensions are limited by both the light source and the optical table.

A more desirable holographic process would avoid these restrictions by requiring a light source with less stringent temporal coherence specifications and no vibration isolation equipment. In addition a polychromatic light source offers the potential to record either true color or pseudo-color holographic images over a wide range of color bands.

SUMMARY OF THE INVENTION

An apparatus according to this invention suitable for forming a holographic image uses a white light source capable of generating a beam of white light of the desired intensity. The light beam is focused by a lens and passed through an aperture to provide a point source type illumination and the light is directed on to the object to be imaged. An imaging lens receives the light reflected from the object and focuses the reflected light onto a diffraction grating which is in intimate contact with a photographic emulsion. The light is transmitted through the diffraction grating forming a holographic image of the object onto the photographic emulsion. The recorded holographic image can be reconstructed using conventional white light processing techniques for low spatial frequency gratings and ordinary image plane holographic reconstruction for high spatial frequency diffraction gratings.

DETAILED DESCRIPTION OF EMBODIMENTS

Figure 1:
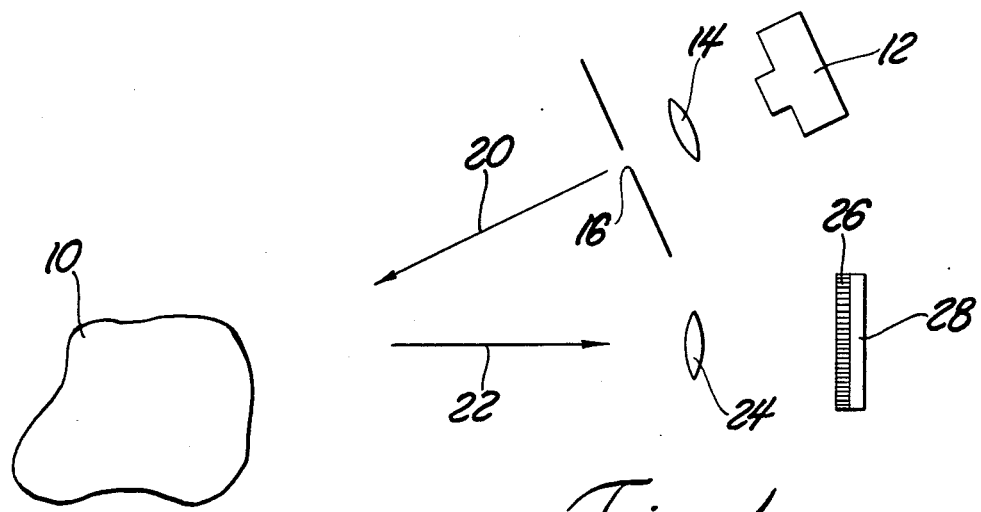
FIG. 1 is a schematic diagram of a hologram recording apparatus according to this invention.

Referring to the accompanying drawing in which like numerals refer to like parts, FIG. 1 is a schematic of one acceptable design for making a hologram using a white light source. An object 10 to be imaged is situated on a convenient location such as a table top or stand where it is fully exposed. A source of white light 12 is activated to shine towards the object 10. The light source 12 can be any standard noncoherent light source such as an arc lamp (mercury, carbon, or xenon), incandescent bulbs, neon lamps, or even bright sunshine. The light source used in this invention can be a broad band light source although narrow band light sources would also work. The need for a high degree of temporal coherence is eliminated by the configuration of this invention.

The light beam is passed through a focusing lens 14 which focuses the beam on a spatial filter 16 which, as shown, can be a pin hole. The spatial filter 16 transmits the focused light beam towards object 10. By passing a focused beam through the spatial filter 16, the light impinging on the object 10 will act as if it were generated by a point source. By approximating a point source for illumination, the spatial coherence of the beam is increased to improve the contrast of the holographic fringe pattern.

An incident beam designated by an arrow 20 impinges on the object 10 and is reflected, as a reflected beam 22. The reflected beam 22 passes through an imaging lens 24 which serves to focus the reflected beam 22 onto a diffraction grating 26 which will diffract the reflected beam as it passes through the grating. After diffraction, the diffracted beam impinges on a photographic emulsion 28 forming both a normal photographic negative image and also a holographic speckle pattern.

Using a laboratory apparatus similar in configuration to that shown in FIG. 1, acceptable exposures have been produced. The light source was a 75 watt xenon arc lamp which produced an intense beam of white light which had a temporal coherence length of about 0.75 micron. The light after being focused by a lens was transmitted through a pin hole aperture having a diameter of about 1 millimeter. Standard lenses were used for focusing the incident and reflected light beams.

The diffraction grating 26 can modulate either the amplitude or the phase of the reflected object beam 22. A wide range of diffraction grating frequencies can be used varying from a few line pairs per millimeter to several thousand line pairs per millimeter. The lower frequency gratings are easier to implement and less expensive, but the reconstructed holographic imagery has higher optical noise levels as compared to imagery obtained using high spatial frequency gratings. In addition the high frequency gratings are able to record more detail from the object 10 and gratings with spatial frequencies greater than 500 line pairs per millimeter produce excellent quality holographic imagery. The photographic medium 28 can be any standard black and white holographic film or plates such as Kodak 131 or 649F.

Figure 2:
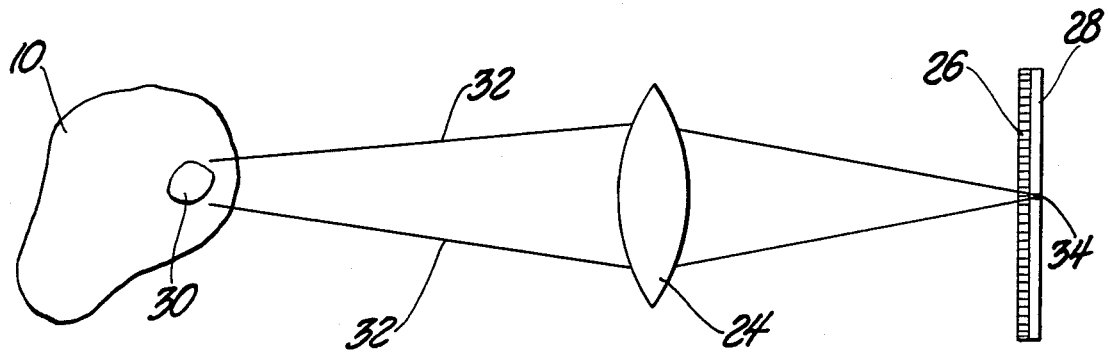
FIG. 2 is a schematic diagram of the apparatus of FIG. 1 showing the reflected light path.

A further understanding of the invention as related to the formation of the holographic image on the film plane can be derived from FIG. 2. The object 10 receives the incident beam and the light from a small area 30 on the surface is reflected as a cone of light defined by lines 32 which impinge on the imaging lens 24. The imaging lens 24 will focus the cone of reflected light through the grating 26 to a point 34 on film emulsion 28. The size of the area 30 is dependent on the lens resolution, its proximity to the focal plane and optical aberations of the system. The diameter of the area 30 which can be properly focused can be approximated by the formula:

$$d = 1.22 \lambda L/D$$

where $\lambda$ is the average wave length of the light, L is the distance between the object 10 and imaging lens 24, and D is the diameter of the imaging lens 24. When the apparatus is properly set up the light rays will have sufficient temporal coherence to produce a holographic image pattern.

The path length difference between two rays incident on the surface within area 30 where the surface texture has a root mean square value can be defined as P.

$$P = (d/2)[\sin(\alpha) + (\beta)] + 2[\cos(\alpha) + \cos(\beta)]$$

where $\alpha$ is the angle of incidence and $\beta$ is the angle of reflection. When the temporal coherence length L of the light beam $L = \lambda^2/\Delta\lambda$ is greater than the path length difference, the pairs of rays reflected from area 30 of object 10 will interfere so as to form an interference pattern in 28 where d is the diameter of 30.

The interference pattern in the image plane at point 34 is the result of summing all the rays from the area 30 in FIG. 2. In the structure of this invention each ray simultaneously represents an object ray and reference ray with respect to all rays reflected from the area 30 of the object 10. Thus the need for an externally applied reference beam is eliminated. Because the rays being reflected are both the object and reference waves the system is self compensating. Thus, since the waves which form each speckle of the hologram are reflected from the same local region of the object 10, they will provide a recording which is very insensitive to environmental effects, especially vibration. Since vibration is a particular problem in generating acceptable holograms, this is an important feature of the present invention.

Figure 3:
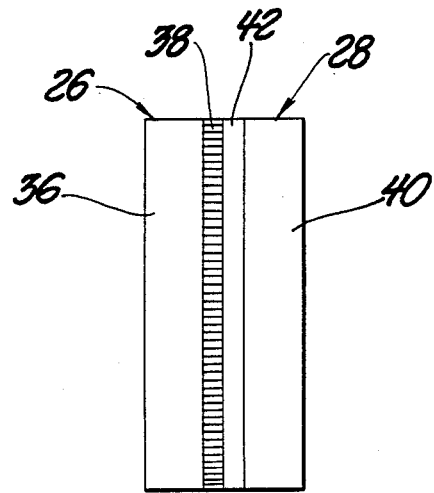
FIG. 3 is an enlarged cross sectional view of diffraction grating and photo-emulsion configuration useful in the practice of a this invention.

FIG. 3 shows one structure of a diffraction grating 26 in intimate contact with a photographic plate 28. The grating 26 comprises an optically clear glass plate 36 with a plurality of parallel grooves 38 formed on one surface. The photographic plate 28 comprises a backing 40 with a thin film 42 of a photographic emulsion. In general, the diffraction grating 26 will usually have equally spaced parallel lines 38 intimately in contact with the photographic emulsion. This generally will be at least 40 lines per millimeter. The larger the number of lines per millimeter the sharper the reproduced image will be. Diffraction gratings from 40 to 1000 lines per milllimeter have been used to form acceptable holographic images. The gratings can diffract the incoming rays either by amplitude transmission variation or phase variations in the index of refraction. Holograms made using gratings with rulings of about 40 to 400 lines per millimeter must generally be transformed using a lens to view the hologram or project it onto a viewing surface. Holograms made using gratings with a high number of lines can be viewed directly with the naked eye if desired or projected onto a screen. The photographic plate's 28 backing 40 can be a flat glass plate or film backing. Suitable photographic emulsions and backing materials are known in the holographic art. In general, the finer the film's grain, the better the hologram will be.

Figure 4:
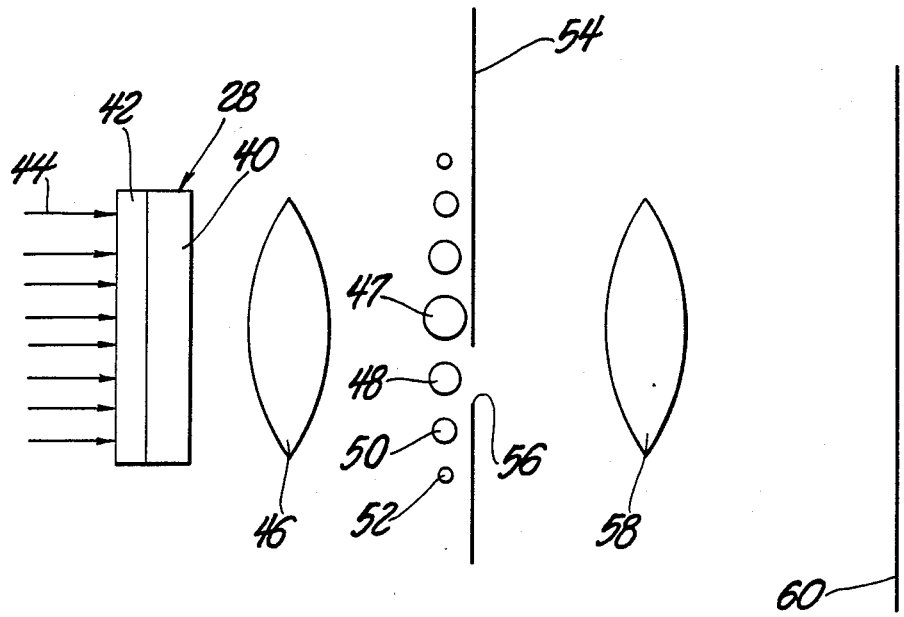
FIG. 4 is schematic diagram suitable for reconstructing a holographic image by transmission through a previously exposed emulsion.

To view the hologram a beam of light is passed through the hologram as shown in FIG. 4. A colimated beam of light is passed through the holographic film 28 containing the negative image of the object 10 and also the holographic interference patterns. The beam 44 diffracts through the grating image imposed on the film emulsion and holographic image. The light is then passed through a converging lens 46 which performs a 2D Fourier transform on the diffracted light beam which is separated into various diffraction orders. The zeroth order 47 contains undiffracted light and no holographic image. Other elements 48, 50, 52 are the first, second and third diffraction orders and all these orders contain a Fourier transform of the holographic image.

As shown, an optical bandpass filter 54 located in the Fourier transform plane has an aperture 56 positioned so as to allow the first order diffraction 48 to pass unimpeded through the aperture 56 incident on a projection lens 58. The lens 58 performs an inverse optical Fourier transform on the holographic image and projects the image onto plane 60.

If the zeroth order 47 is allowed to pass through the optical bandpass filter 54, the projection onto plane 60 will be a negative image similar to ordinary photography. Higher orders 48 etc will project as a 3-D holographic reconstruction of the original object including parallax and a positive intensity function.

When the diffraction grating used to make the original image has approximately 40–300 lines per millimeter, the use of a projection lens is normally required to provide a viewable holographic image. If higher resolution diffraction gratings with 700 or more lines per millimeter are used, the image can be viewed directly with the eyes.

We wish it to be understood that we do not desire to be limited to the exact details of construction shown and described for obvious modifications will occur to a person skilled in the art, without departing from the spirit and scope of the appended claims.

We claim:

1. An apparatus for forming a transmission holographic image of a three dimensional object on a photosensitive material using a white light source including:

a noncoherent white light source capable of generating a beam of white light of the desired intensity;

a focusing means which receives the beam of white light and focuses the beam to a point located at the focal point of the focusing means;

a spatial filter having an aperture to receive the focused beam and transmit the beam as a more spatially coherent beam approximating a point source which is directed onto the three dimensional object to form a reflected light beam;

an imaging means mounted so as to receive the reflected light beam from the three dimensional object and focus the reflected light beam;

a diffraction grid which receives and diffracts the reflected light beam thereby forming a series of diffraction interference patterns on the emulsion, and a photographic emulsion in intimate contact with the diffraction grating to receive the defracted light and record the interference patterns of the reflected light as a holographic image.

2. The apparatus of claim 1 where said photographic emulsion is color sensitive, 3. The apparatus of claim 1 where said diffraction grid is a diffraction grating having at least about 40 lines per millimeter.

4. The apparatus of claim 1 where more than one exposure is made on the same photographic emulsion with the orientation of the diffraction grid being changed with each exposure.

5. An apparatus for forming a transmission holographic image of a three dimensional object on a photosensitive material using a noncoherent white light source including:

a noncoherent source capable of generating a beam of white light of the desired intensity;

a lens mounted so as to receive the beam of white light and focus it at a point;

a spatial filter located so as to receive the focused beam and pass the beam as a more spatially coherent beam which is then directed onto the three dimensional object to be imaged;

an imaging lens mounted to receive the beam of light reflected from the three dimensional object and focus the reflected light;

a diffraction grating which receives the focused beam of reflected light from the imaging lens and diffracts the beam to form interference fringes; and a photographic emulsion located near the focal plane of the imaging lens in intimate contact with the diffraction grating to receive the defracted light forming a negative image and record the interference patterns of the reflected light as a holographic image.

6. The apparatus of claim 5 where said photographic emulsion is color sensitive.

7. The apparatus of claim 5 where said diffraction grid is a diffraction grating having at least about 40 lines per millimeter.

8. The apparatus of claim 5 where more than one exposure is made on the same photographic emulsion with the orientation of the diffraction grid being changed with each exposure.

9. A method for forming a transmission holographic image of a three dimensional object on a photosensitive material including the steps of:

generating a beam of noncoherent white light of the desired intensity;

focusing the beam of white light at a point;

spatially filtering the focused beam of white light to form a more spatially coherent light beam;

directing the spatially coherent beam onto the three dimensional object to be imaged;

focusing the light reflected from the object;

diffracting the focused reflected light to form various orders of interference patterns; and exposing a photographic emulsion to the diffraction pattern's light to record the interference patterns of the diffracted light as a holographic image.

* * * * *